United States Patent
Hu et al.

(10) Patent No.: US 8,606,283 B2
(45) Date of Patent: Dec. 10, 2013

(54) SIGNALLING GAIN FACTORS IN A COMMUNICATION NETWORK SYSTEM

(75) Inventors: Rong Hu, Sollentuna (SE); Qingyu Miao, Beijing (CN); Mats Sagfors, Kyrkslatt (FI); Hai Wang, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 452 days.

(21) Appl. No.: 12/867,104

(22) PCT Filed: Feb. 29, 2008

(86) PCT No.: PCT/SE2008/000167
§ 371 (c)(1), (2), (4) Date: Aug. 11, 2010

(87) PCT Pub. No.: WO2009/108088
PCT Pub. Date: Sep. 3, 2009

(65) Prior Publication Data
US 2010/0317361 A1 Dec. 16, 2010

(51) Int. Cl.
*H04W 72/00* (2009.01)
(52) U.S. Cl.
USPC .................................. 455/450; 455/452.2
(58) Field of Classification Search
USPC ............................. 455/452.2, 450
See application file for complete search history.

(56) References Cited

U.S. PATENT DOCUMENTS

| | | | |
|---|---|---|---|
| 7,110,771 B2 * | 9/2006 | Fisher | 455/452.1 |
| 2006/0111119 A1 * | 5/2006 | Iochi | 455/450 |
| 2008/0220792 A1 * | 9/2008 | Fischer | 455/452.2 |
| 2009/0075669 A1 * | 3/2009 | Franceschini et al. | 455/452.2 |

FOREIGN PATENT DOCUMENTS

| | | |
|---|---|---|
| EP | 1672941 A1 | 6/2006 |
| EP | 1679803 A2 | 7/2006 |
| EP | 1931160 A1 | 6/2008 |
| WO | 2005048491 A1 | 5/2005 |

* cited by examiner

*Primary Examiner* — George Eng
*Assistant Examiner* — Sowmini Nair
(74) *Attorney, Agent, or Firm* — Rothwell, Figg, Ernst & Manbeck, P.C.

(57) ABSTRACT

The invention relates to methods, a user equipment and a communication network entity for optimizing the radio resource utilization in a communication network system comprising a network side and a user equipment side between which data is transmitted on uplink (17) and downlink (16) channels with a transmit power and said user equipment (18) is arranged to adjust said transmit power on said uplink channels (17) according to gain factors received from said network side, wherein said user equipment (18) is located in a location area of said communication network system. The gain factors are transmitted to the user equipment (18) solely when the user equipment (18) accesses the network system instead of transmitting gain factors during every session setup as long as the user equipment (18) is in said location area.

28 Claims, 5 Drawing Sheets

SIGNALLING GAIN FACTORS IN A COMMUNICATION NETWORK SYSTEM

CROSS-REFERENCE TO RELATED APPLICATION

This application is a 35 U.S.C. §371 National Phase Application from PCT/SE2008/000167, filed Feb. 29, 2008, and designating the United States.

TECHNICAL FIELD

The present invention relates to methods and arrangements in a communication network system and, more particularly, to arrangements for optimizing radio resource utilization as well as methods for such optimization.

BACKGROUND

In 3GPP release 6, the WCDMA specifications are extended with a new uplink transport channel, the Enhanced Dedicated Channel (E-DCH), including Enhanced Dedicated Physical Data Channel (E-DPDCH) and Enhanced Dedicated Physical Control Channel (E-DPCCH). The gain factors for E-DPDCH, $\beta_{ed}$, which is used to indicate the power offset between E-DPDCH and DPCCH channels, is very important for uplink system performance as it determines how much power would be allocated to data channel E-DPDCH for certain transport block size. Too much power to E-DPDCH would result in much interference and affect other users' performance; on the other hand, too low power to E-DPDCH would affect the quality of this user itself.

Depending on the amount of data to be transmitted on the data channel, the transport format is different. For different transport format, to get the desired transmission error performance, for example, BLock Error Rate (BLER), the required power is different. Therefore, the power offset depends on the transport format used on the data channel. Usually there is a table to describe the relationship between the transport format and the required power offset.

The Node B and the user equipment (UE) both need to know this table for scheduling and transport format selection. Currently, the table index is signalled to the UE. When the number of transport formats is large, signalling all gain factors for the whole table requires large signalling overhead. Therefore, usually, only several transport formats are selected as reference transport formats, and their gain factors are signalled to the UE. For other non-reference transport formats, their gain factors need to be calculated by either interpolation or extrapolation based on the signalled gain factors of the reference transport formats. The gain factors of these reference transport formats can be obtained by link-level simulations.

According to 3GPP 25.331, other gain factors need to be calculated according to the reference E-DPDCH gain factors as below.

$$\beta_{ed,j} = \beta_{ed,ref} \sqrt{\frac{L_{e,ref}}{L_{e,j}}} \sqrt{\frac{K_{e,j}}{K_{e,ref}}} \quad (1)$$

Where $L_{e,ref}$ and $L_{e,j}$ are the number of E-DPDCHs used for the reference E-DCH Transport Format Combination (E-TFC) and the j:th E-TFC respectively. $K_{e,ref}$ and $K_{e,j}$ denote the transport block size of the reference E-TFC and the j:th E-TFC respectively.

The reference gain factors $\beta_{ed,ref}$ are calculated from the signalled power offset, $\Delta_{E-DPDCH}$, according to $$\beta_{ed,ref} = \beta_c \cdot 10^{\left(\frac{\Delta_{E-DPDCH}}{20}\right)} \quad (2)$$

where the value $\Delta_{E-DPDCH}$ in UE is signalled from the network. In current specification, its range is between $[0, 1, \ldots, 29]$.

In 3GPP Release 7, there is a new interpolation based formula defined for uplink E-DPDCH gain factor for higher bit rates after introducing 16QAM. In current 3GPP specification, it is allowed to signal up to 8 reference gain factors from the network to UE.

Using these limited reference gain factors (at most 8 values in current specification) for calculation of many E-DCH Transport Format Combination Indicators (E-TFCIs) (more than 100) will lead to less accurate and thus less efficient E-TFCIs. For example, for VoIP services, the selected E-TFCIs are usually small while for uploading services, the selected E-TFCIs are usually large. If the limited reference values are signalled to UE probably favourable for VoIP services, obviously the selected E-TFCIs for uploading services may be subject to much inaccuracy, and vice versa. In addition, as the current reference value is a quantized value, there is a quantization error and it is in fact not small in some sense. For example, if a $\beta_{ed}/\beta_c$ value of 57 is needed, we have to use a $\beta_{ed}/\beta_c$ value of either 53 or 60 by signalling $\Delta_{E-DPDCH}$ of either 19 or 20.

Another problem in existing solutions is that the reference gain factors have to be signalled to UE via a Radio Resource Control (RRC) whenever UE has a session setup to the network via Enhanced Uplink (EUL), regardless whether or not the reference gain factors have been signalled to the UE before. The current situation is that after releasing a RRC connection, maybe the network will with almost 100% certainty set up exactly the same RRC connection with the same reference factors. Actually, these reference factors maybe not necessary to be signalled to UE for many times at least in one vendor's UMTS Terrestrial Radio Access Network (UTRAN) system or one of its product versions. On the other hand, the current signalling mechanism makes signalling the whole table almost impossible due to much overhead increasing a session setup delay.

SUMMARY

Accordingly, one objective with the present invention is to provide an improved method in a user equipment of optimizing radio resource utilization in a communication network system comprising a network side and a user equipment side between which data is transmitted on uplink and downlink channels with a transmit power and said user equipment is arranged to adjust said transmit power on said uplink channels according to gain factors received from said network side, wherein said user equipment is located in a location area of said communication network system.

According to a first aspect of the present invention this objective is achieved through a method as defined in the characterising portion of claim 1, which specifies that radio resource utilization is optimized by a method which performs the steps of when initially accessing said communication network system, sending to said network side what type of category said user equipment belongs to; receiving information on an enhanced dedicated channel transport format combination index (E-TFCI) table selected by said network side based on said sent category; and, receiving gain factors corresponding to said selected enhanced dedicated channel transport format combination index (E-TFCI) table solely during said access procedure from said network side instead of receiving gain factors during every session setup as long as said user equipment is in said location area.

Another objective with the present invention is to provide an improved method in a communication network entity of optimizing radio resource utilization in a communication network system comprising a network side and a user equipment side between which data is transmitted on uplink and downlink channels with a transmit power and said user equipment is arranged to adjust said transmit power on said uplink channels according to gain factors received from said network side, wherein said user equipment is located in a location area of said communication network system.

According to a second aspect of the present invention this other objective is achieved through a method as defined in the characterising portion of claim 8, which specifies that radio resource utilization is optimized by a method which performs the steps of receiving from said user equipment what type of category said user equipment belongs to when said user equipment initially accesses said communication network system; selecting an enhanced dedicated channel transport format combination index (E-TFCI) table based on said received category; transmitting information on said selected enhanced dedicated channel transport format combination index (E-TFCI) table to said user equipment; and, transmitting to said user equipment gain factors corresponding to said selected enhanced dedicated channel transport format combination index (E-TFCI) table solely during said access procedure instead of transmitting gain factors during every session setup as long as said user equipment is in said location area.

A further objective with the present invention is to provide an improved user equipment for optimizing radio resource utilization in a communication network system comprising a network side and a user equipment side between which data is transmitted on uplink and downlink channels with a transmit power and said user equipment is arranged to adjust said transmit power on said uplink channels according to gain factors received from said network side, wherein said user equipment is located in a location area of said communication network system.

According to a third aspect of the present invention this further objective is achieved through a user equipment as defined in the characterising portion of claim 15, which specifies that radio resource utilization is optimized by a user equipment which comprises a transmitter arranged to send to said network side what type of category said user equipment belongs to when initially accessing the communication network system; and, a receiver arranged to receive information on an enhanced dedicated channel transport format combination index (E-TFCI) table selected by said network side based on said sent category and to receive gain factors corresponding to said selected enhanced dedicated channel transport format combination index (E-TFCI) table solely during said access procedure from said network side instead of receiving gain factors during every session setup as long as said user equipment is in said location area.

A yet further objective with the present invention is to provide an improved communication network entity for optimizing radio resource utilization in a communication network system comprising a network side and a user equipment side between which data is transmitted on uplink and downlink channels with a transmit power and said user equipment is arranged to adjust said transmit power on said uplink channels according to gain factors received from said network side, wherein said user equipment is located in a location area of said communication network system.

According to a fourth aspect of the present invention this further objective is achieved through a communication network entity as defined in the characterising portion of claim 22, which specifies that radio resource utilization is optimized by a communication network entity which comprises a receiver arranged to receive from said user equipment what type of category said user equipment belongs to when said user equipment initially accesses said communication network system; means for selecting an enhanced dedicated channel transport format combination index (E-TFCI) table based on said received category; and, a transmitter arranged to transmit information on said selected enhanced dedicated channel transport format combination index (E-TFCI) table to said user equipment and to transmit to said user equipment gain factors corresponding to said selected enhanced dedicated channel transport format combination index (E-TFCI) table solely during said access procedure instead of transmitting gain factors during every session setup as long as said user equipment is in said location area.

Further embodiments are listed in the dependent claims.

Thanks to the provision of methods and arrangements, in which gain factors are signalled to the UE only when the UE turns power on rather than during every session setup, there is less frequent signalling due to no signalled factors per session setup, the signalling process is simplified, the session setup delay is shorter, much more accurate power offset settings are obtained and the system is more network controlled and less UE dependent.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
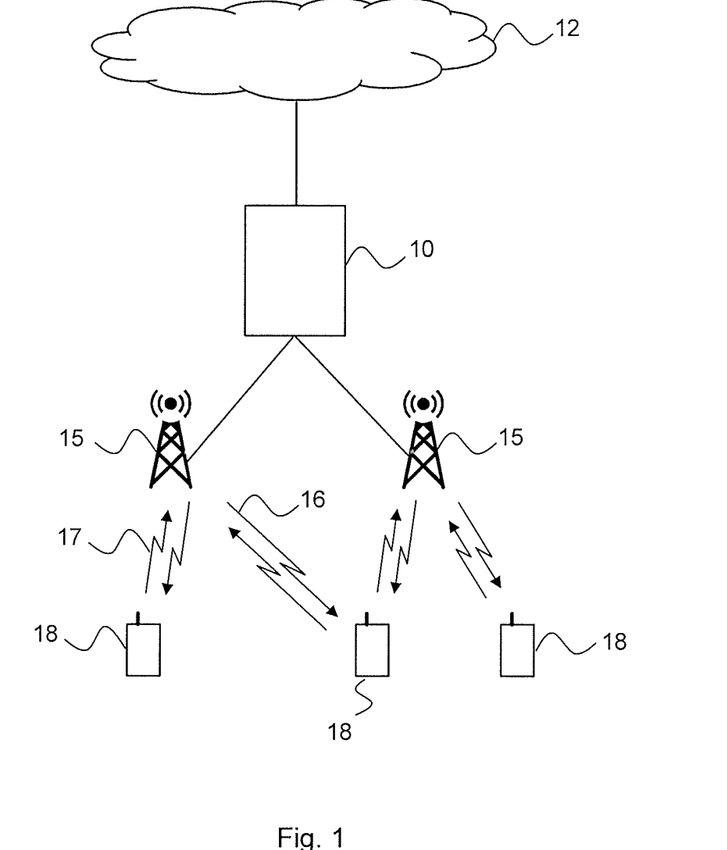
FIG. 1 shows a communication network architecture according to the present invention.

FIG. 1 depicts a communication system including a Radio Access Network (RAN), such as the UMTS Terrestrial Radio Access Network (UTRAN) architecture, comprising at least one Radio Base Station (RBS) (eNode B or Node B) 15 (two are shown in FIG. 1) connected to one or more Radio Network Controllers (RNCs) 10. The RAN is connected to a Core network (CN) 12. The RAN and the CN 12 provide communication and control for a plurality of user equipments (UE) 18 that each uses downlink (DL) channels 16 and uplink (UL) channels 17. For the reason of clarity, only one uplink channel is denoted 17 and one downlink channel denoted 16. On the downlink channel 16, the RBS 15 transmits to each user equipment 18 at respective power level. On the uplink channel 17, the user equipments 18 transmit data to the RBS 15 at respective power level.

According to a preferred embodiment of the present invention, the communication system is herein described as a WCDMA communication system. The skilled person, however, realizes that the inventive method and arrangement works very well on other packet based communications systems as well, such as a Long Term Evolution (LTE) system. The user equipments 18 may be mobile stations such as mobile telephones ("cellular" telephones) and laptops with mobile termination and thus may be, for example, portable, pocket, hand-held, computer-included or car-mounted mobile devices which communicate voice and/or data with the RAN.

This invention proposes that, provided a UE category, the network signals all gain factors for all E-TFCIs through the Forward Access Channel (FACH) (or Enhanced FACH) to this UE only when UE turns power on rather than during every session setup. When UE does a location update registration (URA-UTRAN Registration Area), the network either always signal the gain factors to UE or first does an integrity check of the version of gain factors already existing at UE and then decide the necessity of updating the gain factors.

Since the network is aware of the UE category, in principle, it may signal all gain factors corresponding to one specific table to this UE. Different network vendors or even the same vendor are allowed to have different gain factors settings. For example, different factors might be set depending on whether interference cancellation is used for EUL or not.

Figure 2A:
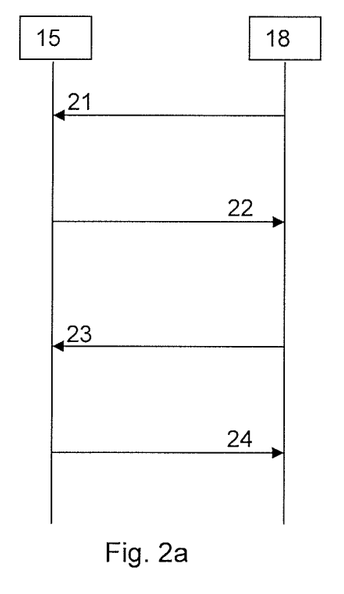
FIG. 2a illustrates a proposed signaling mechanism according to a first solution.
Figure 2B:
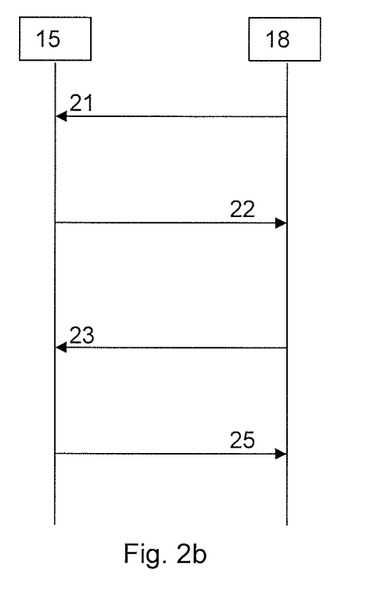
FIG. 2b illustrates a proposed signaling mechanism according to a second solution.
Figure 2C:
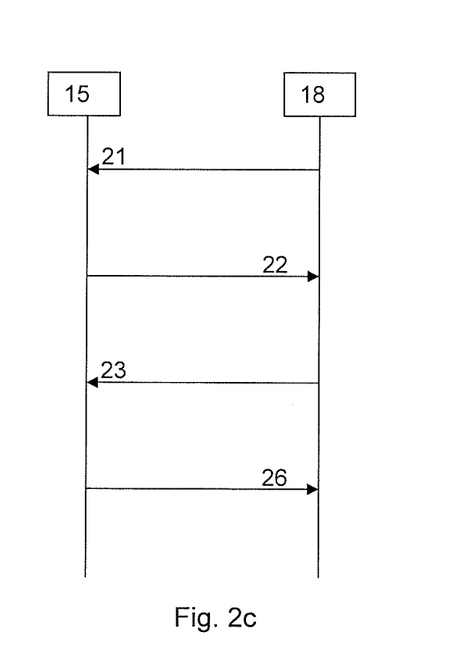
FIG. 2c illustrates a proposed signaling mechanism according to a third solution.

FIGS. 2a, 2b and 2c illustrate the inventive signaling mechanisms. According to the preferred embodiment of the access procedure of the present invention, when the UE 18 turns power on, the UE category information is sent to the network (step 21). The network then selects one UE specific E-TFCI table and informs this UE by using information element "E-TFCI table index". Meanwhile, the network signals to the UE 18 the gain factors corresponding to this specific E-TFCI table (step 22).

The UE sends a location update message to the network (step 23), whereby the network decides whether this is a known UE, already registered, or if it is a new visitor. Once the location update registration is done, the network may take one of three solutions as illustrated in FIGS. 2a, 2b and 2c:

According to solution A, shown in FIG. 2a, gain factors are always signalled to the UE 18 (step 24). Obviously Solution A simplifies the signalling process to some extent because of less back-and-forth signalling procedure and the network doesn't need to store the information on whether or how the UE 18 has been configured before. On the other hand, solution A has more signalling overhead, compared to the other two solutions described below.

According to solution B, shown in FIG. 2b, the network 15 directly responses with an configuration identity or alternatively configures all to the UE 18 (step 25). For Solution B, the rationality is that in RRC Connected Mode, the UE and its configuration is known by the network, so the RNC should know the current gain factor configurations that the UE has in many cases. Thus, the location update could be "conventional" as in current specification without any new indication, as long as the network responds with an indication of which configuration to use or alternatively configures all gain factors in standard fashion. Compared to solution A, solution B has a requirement on the network side, i.e., the network needs to "remember" this type of configuration for each UE.

According to solution C, shown in FIG. 2c, the network 15 updates the gain factors depending on the reported "gain factor version" from the UE 18 (step 26). For solution C where there is an indication of "gain factor version" needed to report to the network, there might be different methods depending on the UE situation. In many cases, the location update is due to mobility (i.e. Cell- or UTRAN Routing Area change). In that case, the UE would not request any resources for data transmission. So the indication of "gain factor version" might be carried on RACH in principle by expanding the update message, i.e. in step 23. Currently, the Enhanced RACH Work Item for Rel-8 gives new opportunities for expanding such message. If the location updates result in a state-change to Cell-DCH, the indication may be carried on UL DCH.

Table 1 exemplifies the needed signalling qualities for different UE categories, assuming all gain factors need to be signalled. As discussed above, there is a quantization issue in current specifications, some methods seeking better accuracy in the gain factor configuration that would lead to the quantity issue, would be much worse due to the need of signalling these factors for many times. However, in this invention, if the gain factors are signalled just once, it is affordable to use more bits getting better accuracy, e.g. 8 bits for each gain factor.

| EUL UE category | # E-TFCIs[*] | # Gain factors ($\#\beta_{ed}, \#\beta_{ec}$) | Signaling quantity** (bits) |
|---|---|---|---|
| Category 3, 10 ms | 98 | (98, 1) | 98*5 + 4 = 494 |
| Category 6, 10 ms | 121 | (121, 1) | 121*5 + 4 = 609 |
| Category 4, 2 ms | 74 | (74, 1) | 74*5 + 4 = 374 |
| Category 6, 2 ms | 126 | (126, 1) | 126*5 + 4 = 634 |

[*]Just refer to the 3GPP specification.
**In current specification, every $\beta_{ed}$ factor needs 5 bits while only one $\beta_{ec}$ of 4 bits is needed for all E-TFCIs.

Although a straightforward way is to signal all gain factors corresponding to all possible E-TFCIs to UE, there might be room to further reduce the signalling overhead in the proposed idea.

For those systems with fixed Packet Data Unit (PDU) sizes (e.g. 320 bits RLC PDU size or 640 bits RLC PDU size), the network may only signal part of gain factors corresponding to those E-TFCIs that will be used according to the designed PDU size. For some systems supporting of flexible RLC PDU sizes, the network may only need to signal part of gain factors depending on UE capabilities.

Alternatively, a differential method may be used to further reduce the signalling quantity. For instance, only the gain factor for the first E-TFCI is signalled to UE. The differential values between those gain factors for the first E-TFCI and other E-TFCIs are transmitted.

A general classification of different aspects that need to be configured in a UE might be:
  Configuration that typically is common for all UEs (or a group/UE capability class of UEs). This could include the power offsets, but also L2 configuration such as RLC/MAC timers, SRB configurations, "default" bearers and so on.

Dedicated configuration, which is specific to a UE. This includes e.g. uplink channelization codes that no other UE have.

The first class of configuration may either be broadcasted or sent by dedicated signalling to the UEs, while the second class must be signalled by dedicated signalling.

The current situation is that after releasing a RRC connection, maybe the network will with almost 100% certainty set up exactly the same RRC connection with the same RLC timers, MAC multiplexing information, transport format tables etc., which means all parameters will remain the same, but the network acts as if the UE was a memory-less device.

For above parameters, the proposed signalling mechanism in this invention may also be applied, i.e., the network signals these parameters only when UE turns power on and update them if necessary. For example, similar to keep the power offsets in a UE, the UE could also be configured to keep its channelization configuration, and MAC multiplexing configuration as well.

Since the proposed signalling mechanism is quite different from that in the current 3GPP specification. In order to minimize the specification impact, a variant of the proposed signaling mechanism in this invention might be that those parameters may also be configured in a first RRC connection as does in current 3GPP specification. But after this UE has an RRC connection, UE may "remember" some parameters and the network may check the necessity of updating these parameters during other RRC connections to this UE later. This variant may also reduce the signalling overhead during RRC connection and reduce the RRC connection delay.

According to a general embodiment of the present invention the procedure in a user equipment of optimizing radio resource utilization in a communication network system comprising a network side and a user equipment side between which data is transmitted on uplink and downlink channels with a transmit power, wherein said user equipment is located in a location area of said communication network system and when said user equipment is initially accessing said communication network system, comprises the step of receiving pre-determined values of pre-determined parameters solely during said initial access procedure from said network side instead of receiving said pre-determined values of said pre-determined parameters during every session setup as long as said user equipment is in said location area.

And, the procedure in a communication network entity of optimizing radio resource utilization in a communication network system comprising a network side and a user equipment side between which data is transmitted on uplink and downlink channels with a certain transmit power, wherein said user equipment is located in a location area of said communication network system and when said user equipment is initially accessing said communication network system, comprises the step of transmitting pre-determined values of pre-determined parameters solely during said initial access procedure to said user equipment instead of transmitting said pre-determined values of said pre-determined parameters during every session setup as long as said user equipment is in said location area.

Figure 3:
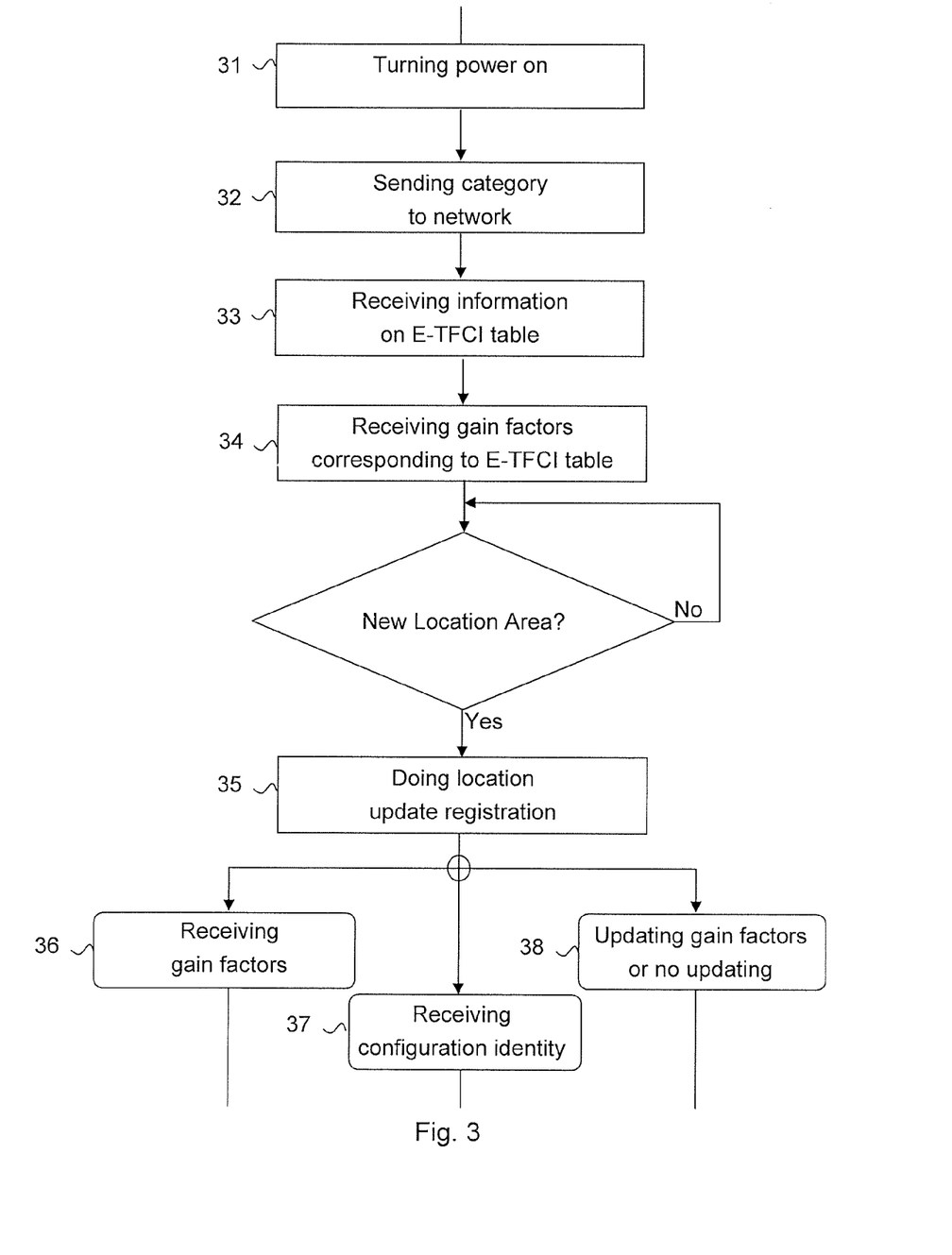
FIG. 3 is a flowchart illustrating the inventive method in a user equipment.

According to a preferred embodiment of the present invention, the procedure in a user equipment of optimizing radio resource utilization in a communication network system comprising a network side and a user equipment side between which data is transmitted on uplink and downlink channels with a certain transmit power, whereby said user equipment is arranged to adjust the transmit power on said uplink channels according to gain factors received from said network side, as shown in FIG. 3, is as follows when said user equipment is located in a location area and accessing said communication network system:

- turning the power on (step 31);
- sending to said network side what type of category said user equipment belongs to (step 32);
- receiving information on an enhanced dedicated channel transport format combination index (E-TFCI) table selected by said network side based on said sent category (step 33);
- receiving gain factors corresponding to said selected enhanced dedicated channel transport format combination index (E-TFCI) table only during said access procedure from said network side instead of receiving gain factors during every session setup (step 34);
- If a new location area is entered, doing a location update registration (step 35);
- After said location update registration, either again receiving gain factors corresponding to said E-TFCI table from said network side (step 36) according to solution A described above shown in FIG. 2*a;*
- Or, receiving a configuration identity and, optionally, updated gain factors from said network side (step 37) according to solution B described above and shown in FIG. 2*b;*
- Or, reporting a gain factor version to said network side and receiving from said network side updated gain factors based on said reported gain factor version or an indication of no updating (step 38) according to solution C described above and shown in FIG. 2*c*.

Figure 4:
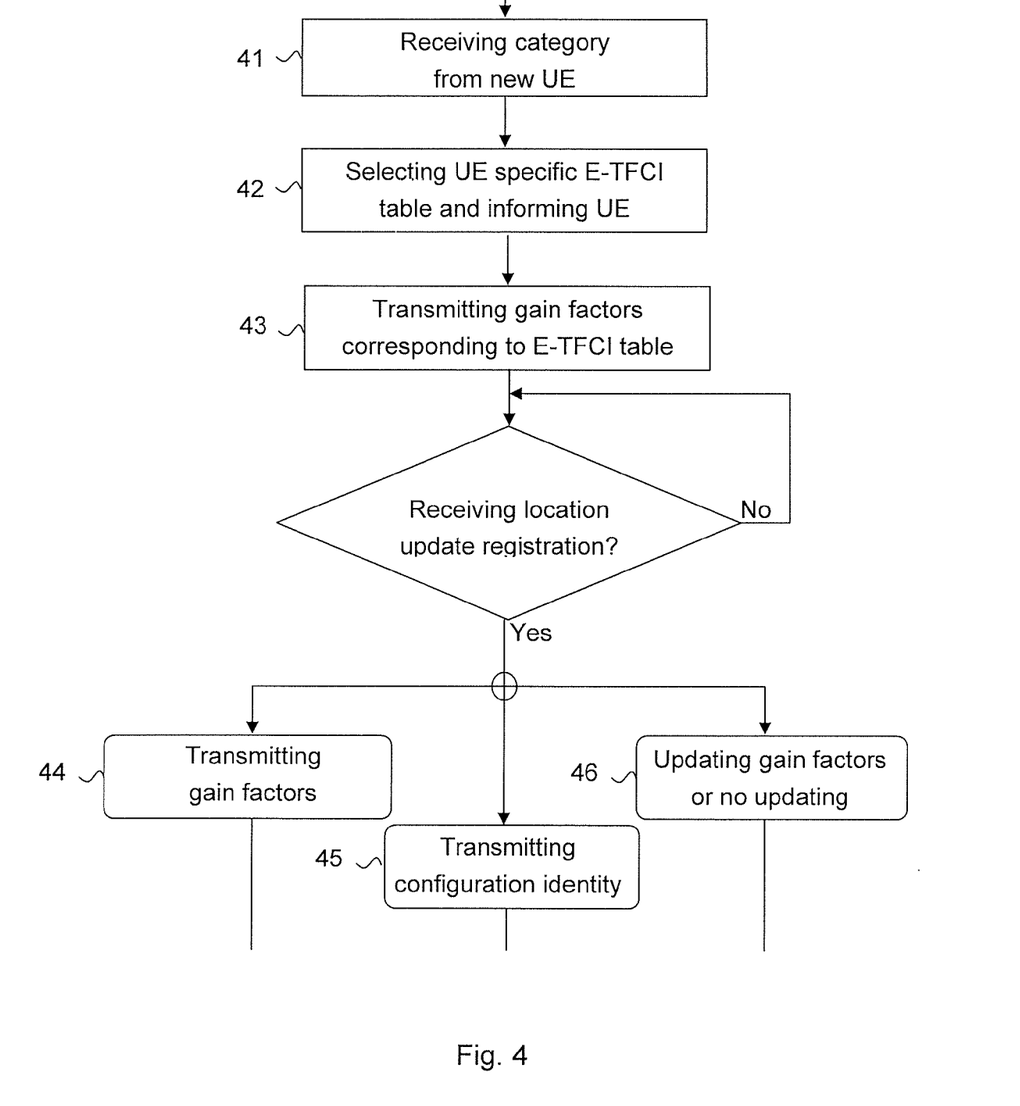
FIG. 4 is a flowchart illustrating the inventive method in a communication network entity.

According to a preferred embodiment of the present invention, the procedure in a communication network entity, such as a RBS, of optimizing radio resource utilization in a communication network system comprising a network side and a user equipment side between which data is transmitted on uplink and downlink channels with a certain transmit power, whereby said user equipment is arranged to adjust the transmit power on said uplink channels according to gain factors received from said network side, as shown in FIG. 4, is as follows when said user equipment is located in a location area and accessing said communication network system and the communication network entity is a part of said network side:

- receiving from said user equipment what type of category said user equipment belongs to when said user equipment turns power on (step 41);
- selecting an enhanced dedicated channel transport format combination index (E-TFCI) table based on said received category and transmitting information on said selected E-TFCI table to said user equipment (step 42);
- transmitting to said user equipment gain factors corresponding to said selected enhanced dedicated channel transport format combination index (E-TFCI) table only during said access procedure instead of transmitting gain factors during every session setup (step 43);
- If a location update registration is received from a new user equipment, either transmitting gain factors corresponding to said E-TFCI table to said user equipment (step 44) according to solution A described above shown in FIG. 2*a;*
- Or, transmitting a configuration identity and, optionally, updated gain factors to said user equipment (step 45) according to solution B described above shown in FIG. 2*b;*
- Or, receiving a report on which gain factor version said user equipment is using and transmitting to said user equipment updated gain factors based on said reported gain factor version or sending an indication of no updating (step 46) according to solution C described above shown in FIG. 2c.

Figure 5:
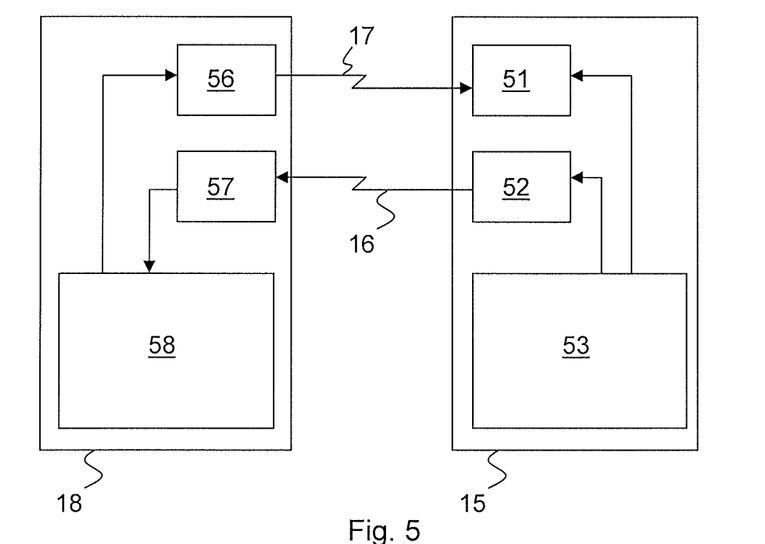
FIG. 5 is a simplified block diagram of an inventive user equipment and radio base station.

FIG. 5 is a block diagram showing a user equipment 18 and a radio base station (RBS) 15, such as Node B, for optimizing radio resource utilization in a communication network system, comprising a network side (e.g. comprising RBSs 15, RNCs and a CN) and a user equipment side between which data is transmitted on uplink 17 and downlink 16 channels with a certain transmit power, whereby said user equipment 18 is arranged to adjust the transmit power on said uplink channels 17 according to gain factors received from said network side. The user equipment is located in a location area and accessing said communication network system when its power is turned on.

The RBS 15 (which is a communication network entity) comprises a radio transmitter 52 and a receiver 51. The transmitter 52 is transmitting data to a receiver 57 of the user equipment 18 over a radio interface on the downlink channel 16. The receiver 51 is receiving data from the user equipment 18 on the uplink channel 17. The receiver 51 is, according to the present invention, arranged to receive from said user equipment what type of category said user equipment belongs to when said user equipment turns power on. The RBS 15 further comprises means 53 for selecting an enhanced dedicated channel transport format combination index (E-TFCI) table based on said received category. The transmitter 52 is thereby arranged to transmit information on said selected E-TFCI table to said user equipment 18 and to transmit to said user equipment 18 gain factors corresponding to said selected E-TFCI table only during said access procedure instead of transmitting gain factors during every session setup. When said user equipment 18 is moving into a new location area said receiver 51 is further arranged to receive a location update registration. Thereby one of the above described embodiments, shown in FIGS. 2a-2c, is selected.

The user equipment 18 comprises a radio transmitter 56 arranged to transmit data packets to the receiver 51 of the RBS 15 over the radio interface on the uplink channel 17 and a receiver 57 arranged to receive data packets transmitted from the transmitter 52 of the RBS 15 on the downlink channel 16. The transmitter 56 is further arranged to send to said network side what type of category said user equipment belongs to when the power of said user equipment is turned on. The receiver 57 is further arranged to receive information on an enhanced dedicated channel transport format combination index (E-TFCI) table selected by said network side based on said sent category and to receive gain factors corresponding to said selected E-TFCI table only during said access procedure from said network side instead of receiving gain factors during every session setup.

The user equipment 18 further comprises means 58 for doing a location update registration when the user equipment 18 is moving into a new location area. Thereby one of the above described embodiments, shown in FIGS. 2a-2c, is selected.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method in a user equipment (UE) of optimizing radio resource utilization in a communication network system comprising a network side and a UE side between which data is transmitted on uplink and downlink channels with a transmit power, wherein said UE is arranged to adjust transmit power on said uplink channels according to gain factors received from said network side and is located in a location area of said communication network system, the method comprising:

when initially accessing said communication network system, sending to said network side what UE category said UE belongs to; receiving information on an enhanced dedicated channel transport format combination index (E-TFCI) table selected by said network side based on said sent UE category; and receiving, from said network side, gain factors corresponding to said selected enhanced dedicated channel transport format combination index (E-TFCI) table solely during one of said initial access of said communication network system and the UE performing a location update registration with said network system instead of receiving gain factors during every session setup as long as said UE is located in said location area, wherein said initial access occurs after the UE powering on, wherein said initial access occurs after the UE powering on or after the UE performs a location update registration with said network side.

2. The method according to claim 1, wherein the UE performs the location update registration after said UE is moving into a new location area.

3. The method according to claim 2, wherein, after doing said location update registration, the method further comprises the step of again receiving gain factors corresponding to said enhanced dedicated channel transport format combination index (E-TFCI) table from said network side.

4. The method according to claim 2, wherein, after doing said location update registration, the method further comprises:

receiving a configuration identity from said network side; and optionally, receiving updated gain factors from said network side.

5. The method according to claim 1, further comprising:

when said UE moves into a new location area, doing the location update registration;

reporting a gain factor version to said network side; and receiving from said network side updated gain factors based on said reported gain factor version.

6. The method according to claim 1, wherein said data is transmitted in packets having a pre-determined number of bits and said received gain factors correspond to an enhanced dedicated channel transport format combination index (E-TFCI) which is used by that particular size of data packet.

7. The method according to claim 1, wherein said received gain factors correspond to a first enhanced dedicated channel transport format combination index (E-TFCI) and the method further comprises receiving differential values between said received gain factors for said first enhanced dedicated channel transport format combination index (E-TFCI) and gain factors for other enhanced dedicated channel transport format combination indexes (E-TFCIs).

8. A method in a communication network entity of optimizing radio resource utilization in a communication network system comprising a network side and a user equipment UE side between which data is transmitted on uplink and downlink channels with a transmit power, wherein said UE is arranged to adjust said transmit power on said uplink channels according to gain factors received from said network side and is located in a location area of said communication network system, and wherein said communication network entity is a part of said network side, the method comprising:
receiving from said UE what UE category said UE belongs to when said UE initially accesses said communication network system;
selecting an enhanced dedicated channel transport format combination index (E-TFCI) table based on said received UE category;
transmitting information on said selected enhanced dedicated channel transport format combination index (E-TFCI) table to said UE; and
transmitting to said UE gain factors corresponding to said selected enhanced dedicated channel transport format combination index (E-TFCI) table solely during one of said initial access of said communication network system and the UE performing a location update registration with said network system instead of transmitting gain factors during every session setup as long as said UE is located in said location area, wherein said initial access occurs after the UE powering on or after the UE performs a location update registration with said network side.

9. The method according to claim 8, wherein the communication network system receives the location update registration when said UE is moving into a new location area.

10. The method according to claim 9, wherein, after receiving said location update registration, the method further comprises the step of again transmitting gain factors corresponding to said enhanced dedicated channel transport format combination index (E-TFCI) table to said UE.

11. The method according to claim 9, wherein, after receiving said location update registration, the method further comprises:
transmitting a configuration identity to said UE; and
optionally, transmitting updated gain factors to said UE.

12. The method according to claim 8, further comprising:
when said UE moves into a new location area, receiving the location update registration;
receiving a report on which gain factor version said UE is using; and
transmitting to said UE updated gain factors based on said reported gain factor version.

13. The method according to claim 8, wherein said data is transmitted in packets having a pre-determined number of bits and said transmitted gain factors correspond to an enhanced dedicated channel transport format combination index (E-TFCI) which is used by that particular size of data packet.

14. The method according to claim 8, wherein said transmitted gain factors correspond to a first enhanced dedicated channel transport format combination index (E-TFCI) and the method further comprises transmitting differential values between said transmitted gain factor for said first enhanced dedicated channel transport format combination index (E-TFCI) and gain factors for other enhanced dedicated channel transport format combination indexes (E-TFCIs).

15. A user equipment UE for optimizing radio resource utilization in a communication network system comprising a network side and a UE side between which data is transmitted on uplink and downlink channels with a transmit power, wherein said UE is arranged to adjust said transmit power on said uplink channels according to gain factors received from said network side and is located in a location area of said communication network system, the UE comprising:
a transmitter configured to send to said network side what UE category said UE belongs to when initially accessing the communication network system; and
a receiver configured to receive information on an enhanced dedicated channel transport format combination index (E-TFCI) table selected by said network side based on said sent UE category and to receive gain factors corresponding to said selected enhanced dedicated channel transport format combination index (E-TFCI) table solely during one of said initial access of said communication network system and the UE performing a location update registration with said network system instead of receiving gain factors during every session setup as long as said UE is located in said location area, wherein said initial access occurs after the UE powering on or after the UE performs a location update registration with said network side.

16. The user equipment according to claim 15, wherein the UE is configured to perform the location update registration when said UE moves into a new location area.

17. The user equipment according to claim 16, wherein, after doing the location update registration, said receiver is configured to again receive gain factors corresponding to said enhanced dedicated channel transport format combination index (E-TFCI) table from said network side.

18. The user equipment according to claim 16, wherein, after doing the location update registration, said receiver is configured to receive a configuration identity from said network side and, optionally, to receive updated gain factors from said network side.

19. The user equipment according to claim 15, further comprising:
a location update registration unit configured to do the location update registration when said UE moves into a new location area: and
a gain factor reporting unit configured to report a gain factor version to said network side, whereby said receiver is configured to receive from said network side updated gain factors based on said reported gain factor version.

20. The user equipment according to claim 15, wherein said data is transmitted in packets having a pre-determined number of bits and said received gain factors correspond to an enhanced dedicated channel transport format combination index (E-TFCI) which is used by that particular size of data packet.

21. The user equipment according to claim 15, wherein said received gain factors correspond to a first enhanced dedicated channel transport format combination index (E-TFCI) and said receiver is further configured to receive differential values between said received gain factor for said first enhanced dedicated channel transport format combination index (E-TFCI) and gain factors for other enhanced dedicated channel transport format combination indexes (E-TFCIs).

22. A communication network entity for optimizing radio resource utilization in a communication network system comprising a network side and a user equipment (UE) side between which data is transmitted on uplink and downlink channels with a transmit power, wherein said UE is configured to adjust said transmit power on said uplink channels according to gain factors received from said network side and is located in a location area of said communication network system, and wherein said communication network entity is a part of said network side, said communication network entity comprising:
a receiver configured to receive from said UE what type of category said UE belongs to when said UE initially accesses said communication network system;
a selecting unit configured to select an enhanced dedicated channel transport format combination index (E-TFCI) table based on said received UE category; and
a transmitter configured to transmit information on said selected enhanced dedicated channel transport format combination index (E-TFCI) table to said UE and to transmit to said UE gain factors corresponding to said selected enhanced dedicated channel transport format combination index (E-TFCI) table solely during one of said initial access of said communication network system and the UE performing a location update registration with the network system instead of transmitting gain factors during every session setup as long as said UE is located in said location area, wherein said initial access occurs after the UE powering on or after the UE performs a location update registration with said network side.

23. The communication network entity according to claim 22, wherein the communication network system is configured to receive the location update registration when said UE moves into a new location area.

24. The communication network entity according to claim 23, wherein, after receiving said location update registration, said transmitter is configured to again transmit gain factors corresponding to said enhanced dedicated channel transport format combination index (E-TFCI) table to said UE.

25. The communication network entity according to claim 23, wherein, after receiving said location update registration, said transmitter is further configured to transmit a configuration identity to said UE and, optionally, to transmit updated gain factors to said UE.

26. The communication network entity according to claim 22, wherein, when said UE moves into a new location area, said receiver is further configured to receive the location update registration and to receive a report on which gain factor version said UE is using, and said transmitter is further arranged to transmit to said UE updated gain factors based on said reported gain factor version.

27. The communication network entity according to claim 22, wherein said data is transmitted in packets having a predetermined number of bits and said transmitted gain factors correspond to an enhanced dedicated channel transport format combination index (E-TFCI) which is used by that particular size of data packet.

28. The communication network entity according to claim 22, wherein said transmitted gain factors correspond to a first enhanced dedicated channel transport format combination index (E-TFCI), and said transmitter is further configured to transmit differential values between said transmitted gain factor for said first enhanced dedicated channel transport format combination index (E-TFCI) and gain factors for other enhanced dedicated channel transport format combination indexes (E-TFCIs).

* * * * *